United States Patent
de Lange et al.

(10) Patent No.: US 6,608,151 B1
(45) Date of Patent: Aug. 19, 2003

(54) METHOD FOR PRODUCING SUPPORTED CHROME CATALYSTS AND THE USE THEREOF FOR THE POLYMERIZATION OF OLEFINS

(75) Inventors: Paulus de Lange, Wesseling (DE); Guido Funk, Worms (DE); Andreas Deckers, Flomborn (DE); Peter Kölle, Bad Dürkheim (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/070,341

(22) PCT Filed: Aug. 31, 2000

(86) PCT No.: PCT/EP00/08484

§ 371 (c)(1),
(2), (4) Date: Feb. 28, 2002

(87) PCT Pub. No.: WO01/17675

PCT Pub. Date: Mar. 15, 2001

(30) Foreign Application Priority Data

Sep. 9, 1999 (DE) .......................................... 199 43 167

(51) Int. Cl.[7] .................................................. C08F 4/24
(52) U.S. Cl. ........................ 526/106; 526/130; 502/305
(58) Field of Search ................................ 526/106, 130; 502/305

(56) References Cited

U.S. PATENT DOCUMENTS

| 2,825,721 | A |   | 3/1958  | Hogan et al. ............... 260/88.1 |
| 2,930,789 | A |   | 3/1960  | Kerber et al. ............... 260/94.9 |
| 3,960,826 | A | * | 6/1976  | Aboutboul et al. |
| 4,209,603 | A |   | 6/1980  | Van de Leemput ......... 526/129 |
| 4,364,839 | A |   | 12/1982 | McDaniel et al. ........... 252/430 |
| 4,364,939 | A |   | 12/1982 | Autissier et al. ............. 424/180 |
| 4,967,029 | A |   | 10/1990 | Wu .............................. 585/12 |
| 5,037,911 | A |   | 8/1991  | McDaniel et al. ........... 526/130 |
| 5,231,066 | A |   | 7/1993  | Rekers et al. ................ 502/239 |
| 5,405,819 | A |   | 4/1995  | Mueller et al. .............. 502/210 |
| 5,726,260 | A | * | 3/1998  | Derleth et al. |

FOREIGN PATENT DOCUMENTS

| DE | 25 40 279 | 3/1977 |
| DE | 42 28 883 | 3/1994 |
| GB | 1 550 951 | 9/1976 |
| WO | 95/18782  | 7/1995 |

OTHER PUBLICATIONS

McDaniel, M. P., "Supported Chromium Catalysts for Ethylene Polymerization," *Advances in Catalysis* 33:47–98 (1985).

* cited by examiner

*Primary Examiner*—Caixia Lu
(74) *Attorney, Agent, or Firm*—Connolly Bove Lodge & Hutz LLP

(57) ABSTRACT

The invention relates to a method for producing supported chromium catalysts for the polymerisation of olefins by loading a xerogel support with chromium by adding to the xerogel support a volume of a 0.025 to 15% by weight solution of a chromium compound or a volume of a solution comprising from 0.025 to 7.8% by weight of Cr which is essentially converted into a chromium(VI) compound on heating in a water-free stream of gas under oxidizing conditions at temperatures in the range from 300 to 1100° C. for a period of from 10 to 1000 minutes in a solvent which comprises a maximum of 20% by weight of water, and subsequently evaporating the solvent, where the volume of the chromium salt solution employed is smaller than the pore volume of the xerogel support.

9 Claims, No Drawings

METHOD FOR PRODUCING SUPPORTED CHROME CATALYSTS AND THE USE THEREOF FOR THE POLYMERIZATION OF OLEFINS

This application is a continuation of PCT/EP00/08484 filed Aug. 31, 2000 which published as WO 01/17675 on Mar. 15, 2001 and claims benefit to German application 199 43 167.1 filed Sep. 9, 1999.

The invention relates to a method for producing supported chromium catalysts for the polymerisation of olefins, and to the catalysts obtainable by the method according to the invention.

For the purposes of the invention, the term supported chromium catalysts denotes chromium catalysts as used for the polymerisation of α-olefins (cf. M. P. McDaniel, Adv. Cat. 33, pages 47 to 98 (1985)).

Polymerisation catalysts which comprise silica gel or modified silica gel as support material and chromium as active component play a major role in the production of high-density polyethylene (HD-PE).

The conditions during production of the supports and catalysts determine the chemical composition, pore structure, particle size and shape of the catalysts. Before the polymerisation, the catalysts are activated at high temperatures under oxidizing conditions in order to stabilise chromium on the catalyst surface. The catalyst is subsequently reduced by addition of ethene or additional reducing agents in order to form the catalytically active species which catalyses the polymerisation.

The production of supported chromium catalysts of this type is usually carried out in two steps. In a first step, the support material is firstly brought into contact with a soluble chromium compound in a suitable solvent. In a second step, the mixture of support and chromium compound is subsequently calcined in a stream of air or in a stream of oxygen at high temperatures, approximately between 300 and 1100° C. The nature of the support material is of major importance.

Suitable supports can be produced as described in DE-A 25 40 279. This process relates to the preparation of a silicic acid hydrogel having a solids content of from 10 to 25% by weight (calculated as $SiO_2$) whose particles are substantially spherical, by introducing a sodium or calcium water-glass solution into a swirling stream of a mineral acid, both longitudinally and tangentially to the stream, spraying the resultant silicic acid hydrosol in drop form into a gaseous medium, allowing the hydrosol to solidify in a gaseous medium to give hydrogel particles, washing the resultant, substantially spherical hydrogel particles in order to free the hydrogel from salts, extracting the hydrogel particles with an alcohol until at least 60% of the water present in the hydrogel has been removed, drying the resultant hydrogel at temperatures of $\leq 160°$ C. at atmospheric pressure using an inert entraining gas until the residual alcohol content is below 10% (xerogel formation), setting the desired particle size of the resultant xerogel.

On the other hand, the silicon aluminium phosphate supports disclosed in DE-A 42 28 883 can be used.

The chromium oxide catalysts are generally produced as described in DE-A 25 40 279 or in a similar manner. In order to load the catalyst support with a chromium compound, the xerogel obtained is loaded with the desired amount of chromium by means of a 0.05 to 15% by weight solution of a chromium compound which is essentially converted into a chromium(VI) compound under the reaction conditions mentioned below, in an alcohol comprising a maximum of 20% by weight of water, by evaporation of the alcohol, and the resultant product is heated at temperatures in the range from 300 to 1100° C. for a period of from 10 to 1000 minutes in a water-free gas stream which comprises at least 10% by volume of oxygen.

The said supported chromium catalysts have a number of disadvantages. It has been found that the chromium compound attaches principally to the outer regions of the catalyst support, while the inner regions are wetted to a much lesser extent. However, since the inner regions of the catalyst particles also participate in the catalysis, an inhomogeneous chromium distribution of this type is highly undesirable. In addition, chromium agglomerates formed due to locally limited deposition of chromium compounds on the catalyst surface are frequently observed.

The object of the invention is to indicate a method for producing a supported chromium catalyst which has a more uniform chromium distribution over the catalyst support particle cross section and which substantially avoids the formation of chromium agglomerates.

The object is achieved in accordance with the invention by a method for producing supported chromium catalysts by loading a xerogel support with chromium by a) adding to the xerogel support a volume of a 0.025 to 15% by weight solution of a chromium compound or a volume of a solution comprising from 0.025 to 7.8% by weight of Cr which is essentially converted into a chromium(VI) compound on heating under oxidizing conditions at temperatures in the range from 300 to 1100° C. for a period of from 10 to 1000 minutes in a solvent which comprises a maximum of 20% by weight of water, and subsequently b) evaporating the solvent.

The invention is then characterised in that the volume of the chromium salt solution employed is smaller than the pore volume of the xerogel support. Xerogels are gels which have lost their liquid in some way (through evaporation, squeezing or aspiration), with the spatial arrangement of the network being changed in such a way that the separations between the structural elements only have dimensions of atomic separations. Xerogel supports can be produced based on silica gel as described in DE-A 25 40 279. Besides xerogel supports based on silica gel, however, xerogel supports based on aluminium phosphate or xerogel supports based on aluminium oxide/silicon oxide cogels or aluminium silicate gels are also suitable (cf. U.S. Pat. No. 2,825,721 or U.S. Pat. No. 2,930,789). When selecting the xerogel supports, those having a large pore volume of up to 3 ml/g are preferred. Suitable solvents for the chromium compound are, for example, alcohols or $C_3$–$C_5$-alkanones. $C_{1-C_4}$-alcohols are preferred, in particular methanol.

The details of the impregnation are given, for example, in DE-A 25 40 279. Suitable chromium compounds are, for example, chromium trioxide, chromium hydroxide and soluble salts of trivalent chromium with an organic or inorganic acid, such as acetate, oxalate, sulphate or nitrate. Particular preference is given to salts of acids which, on activation, are essentially converted into chromium(VI) without leaving a residue, such as chromium(III) nitrate nonahydrate. A volume of a solvent which comprises the chromium compound is added to the xerogel support. The volume of this chromium solution is smaller than the pore volume of the xerogel support.

The pore volume of the xerogel support is determined by the method described in the working example (see Table 1). The volume of the solvent is preferably less than 95%, especially less than 90%, in particular from 75 to 85%, of the pore volume of the xerogel support.

The xerogel support and the chromium solution (if desired with addition of fluorinating agents, such as ASF, ammonium hexafluorosilicate) are subsequently mixed, for example in a double-cone mixer. The solvent and any water present therein are distilled off at temperatures in the range from 20 to 200° C., preferably from 100 to 150° C., and pressures in the range from 1.3 mbar to 1 bar, preferably from 300 to 900 mbar.

The catalyst is activated (if desired with addition of fluorinating agents, such as ASF, ammonium hexafluorosilicate) under oxidizing conditions, for example in a water-free gas stream which comprises at least 10% by volume of oxygen, preferably at temperatures in the range from 300 to 1100° C., particularly preferably at temperatures of from 500 to 800° C., over a period of preferably from 60 to 1000 minutes, particularly preferably from 200 to 800 minutes, for example in a fluidised bed through which a stream of air flows.

The method according to the invention results in a catalyst having a chromium content of from 0.1 to 3% by weight, preferably from 0.7 to 1.5% by weight, particularly preferably from 0.9 to 1.2% by weight.

This is suitable for the homopolymerisation and copolymerisation of unsaturated compounds. The unsaturated compounds employed are preferably ethene or $C_3$- to $C_8$-α-monoolefins.

It was hitherto not known that the amount of solvent in which the chromium compound is dissolved influences the properties of the supported chromium catalyst. Hitherto, at least the amount of solvent which corresponds to the pore volume of the support was used. This is because the person skilled in the art expects that all pores must be filled for an optimum chromium distribution. Thus, for example in U.S. Pat. No. 5,231,066, bimodal silica gel particles were impregnated with a chromium solution whose volume was a multiple of the pore volume of the support. U.S. Pat. No. 4,209,603 likewise disclosed an improved supported chromium catalyst for the polymerisation of a-alkenes during the impregnation of which an excess of solvent was employed.

In the production of supported chromium catalysts for the production of lubricants, xerogel supports based on silica gel were impregnated with solutions of a chromium compound in acetic acid whose volume corresponded to the pore volume of the support (U.S. Pat. No. 4,967,029 and WO 95/18782).

Surprisingly, it has now been found that a further reduction in the volume of the impregnating agent improves the homogeneity of the chromium distribution. It has been demonstrated by scanning electron microscopy (SEM) and electron probe microanalysis (EPMA) that on use of the method according to the invention, a greater proportion of chromium is bound in the interior of the xerogel support particle. In this way, a more homogeneous distribution of the chromium is thus achieved. In addition, the reduction in the volume of the impregnating agent has the consequence, to the complete surprise of experts, that no wall coatings are formed in the impregnation reactor and in the drying apparatus.

The invention furthermore relates to a supported chromium catalyst which is obtainable by a method according to the invention. This catalyst can be used in accordance with the invention for the polymerisation of ethene and/or of $C_3$–$C_{10}$-α-monoolefins. Owing to the improved production method, the catalyst according to the invention has increased productivity and results in polymers having improved mechanical properties, for example increased stress cracking resistance. The invention furthermore relates to a method for the polymerisation of ethene and/or of $C_3$–$C_{10}$-α-monoolefins in which a supported chromium catalyst according to the invention is used as catalyst.

The invention furthermore relates to polyethylenes obtainable by the above-mentioned method.

The invention is described in greater detail for the person skilled in the art by the following working example.

Example 10 kg of xerogel support produced as described in DE 25 40 279 and 17 l of a 5.4% by weight solution of chromium (III) nitrate nonahydrate in methanol were introduced into a double-cone mixer. The methanol was then distilled off in a water-pump vacuum with rotation of the mixer, which was externally heated to 130° C. by means of steam. The precursor obtained in this way had an analytically determined chromium content of around 0.0002 mol/g. The distribution of the chromium was determined by SEM and EPMA.

The resultant product was heated at a temperature of 630° C. for 6 hours in a fluidised bed through which a stream of air was passed and then cooled again. From 140° C., a stream of nitrogen was passed through the fluidised bed in order to remove traces of oxygen (which adversely affect the polymerisation).

In a comparative example, 15 kg of the same xerogel support (produced as described in DE 25 40 279) and 40 l of a 4.1% by weight solution of chromium(III) nitrate nonahydrate in methanol were mixed in a double-cone mixer. The methanol was then distilled off in a water-pump vacuum with rotation of the mixer, which was externally heated to 130° C. by means of steam. The precursor obtained in this way likewise had an analytically determined chromium content of around 0.0002 mol/g. The chromium distribution was likewise determined. The catalyst was subsequently treated in the manner described for the catalyst according to the invention.

The catalyst according to the invention and the comparative catalyst were employed for the polymerisation of ethene and hexene in a 0.2 m³ loop reactor. The melt flow rate and the density were set via the reactor temperature and the comonomer concentration in the suspension medium. The suspension medium used was isobutane. The internal pressure in the reactor was 39 bar, and the reactor density was about 640 kg/m³. The polymerisation was carried out continuously and with maintenance of the ethylene partial pressure. The data are shown in the following tables.

TABLE 1

| Catalyst | Pore volume[1] (ml/g) | Amount of solvent[2] (ml/g) | Cr, external[3] a.u. | Cr, internal[3] a.u. | Cr, a/ Cr, i |
|---|---|---|---|---|---|
| Example | 1.8 | 1.7 | 79 | 21 | 3.8 |
| Comparative example | 1.8 | 2.7 | 87 | 13 | 6.7 |

[1]Pore volume: Water is added in portions to the pulverulent substance to be tested with constant mixing until all pores are saturated with liquid, which is evident from the powder losing its flowability and starting to form lumps. The volume of liquid required per gram of sample corresponds to the pore volume of the sample. For the purposes of the invention, the pore volume was determined as follows: 5 g of the substance to be tested were weighed out into a dry powder bottle (150 ml) with screw cap. Distilled water was added in portions (initially 2 ml, then less and less) from a burette, the bottle was sealed with the screw cap, and the contents were mixed by vigorous shaking. The bottle was then placed vigorously on a cork mat and subsequently rotated. When about ⅓ of the sample remains stuck to the base of the bottle during this operation, the pores are saturated. The water consumption was read off and converted to 1 g of the sample. The standard deviation of the pore volume measurement values is ± 0.02 ml/g.
[2]Amount of solvent: Amount employed for the impregnation.
[3]Chromium distribution: For quantitative analysis of the active components present in the catalyst particles, the catalyst particles are embedded in a nonpolar resin and split with the aid of a milling machine. The resin component must be of such a nature that it does not react with the active components. An amorphous carbon layer with a thickness of about 30 nm is subsequently applied by vapour deposition to the prepared section. The elemental distribution in the particle is visualised with the aid of energy-dispersive X-ray analysis. The electrons hitting the solid stimulate characteristic X-rays at a depth of from 2 to 3 µm below the contact point due to impact ionisation. A detector enables the X-rays emitted by the solid to be detected in an energy-selective manner. In order to determine the elemental distribution, the electron beam is moved line by line over the surface in a 256 × 256 point grid. Automatic sample stage guidance enables a large number of catalyst particles to be measured. The maximum lateral resolution for the elemental distribution is 1 µm. The chromium content is determined in the centre of the particle cross section and immediately beneath the particle surface and is indicated in arbitrary units (a.u.).

TABLE 2

| Catalyst | Polymerisation temperature (° C.) | Productivity[1] (g of PE/g of cat.) | Polymer density (g/ml) in acc. with ISO 1183 | HLMI[2] (g/10 min) ISO 1133 | ESCR[3] (h) |
|---|---|---|---|---|---|
| Example | 106 | 4900 | 0.9463 | 6.5 | 38 |
| Comparative example | 105 | 4100 | 0.9465 | 6.7 | 25 |

[1]Productivity: Specified in g of polyethylene per g of catalyst
[2]HLMI: High load melt index in accordance with ISO 1133
[3]ESCR measurement method: Disc-shaped test specimens (diameter 40 mm, thickness 2 mm, inscribed on one side with a notch having a length of 20 mm and depth of 0.1 mm) are, in order to determine the stress cracking resistance, immersed in 1% Nekanil solution at 80° C. and subjected to a pressure of 3 bar. The time before stress cracks occur is measured.

It is evident from the experiments carried out and described as above that the catalyst according to the invention has a more uniform chromium distribution than the comparative catalyst (chromium, external/chromium, internal: 3.8 compared with 6.7, see Table 1). With a comparable density and comparable flow behaviour, the catalyst according to the invention exhibits a productivity which is increased by almost 20% compared with the comparative catalyst, and the polymer produced using the catalyst according to the invention has improved stress cracking resistance.

What is claimed is:

1. A method for producing supported chromium catalysts for the polymerization of olefins which comprises loading a xerogel support with chromium by a) adding to the xerogel support a volume of a 0.025 to 15% by weight solution of a chromium compound or a volume of a solution comprising from 0.025 to 7.8% by weight of Cr which is essentially converted into a chromium(VI) compound on heating in a water-free stream of gas under oxidizing conditions at temperatures in the range from 300 to 1100° C. for a period of from 10 to 1000 minutes in a solvent which comprises a maximum of 20% by weight of water, and subsequently b) evaporating the solvent, and wherein the volume of the chromium salt solution employed is smaller than the pore volume of the xerogel support.

2. The method according to claim 1, wherein the volume of the chromium salt solution is less than 95% of the pore volume of the xerogel support.

3. The method according to claim 2, wherein the volume of the chromium salt solution is less than 90% of the pore volume of the xerogel support.

4. The method according to claim 3, wherein the volume of the chromium salt solution is from 75 to 85% of the pore volume of the xerogel support.

5. The method according to claim 1, wherein the solvent is a $C_1$–$C_4$-alcohol or a $C_3$–$C_5$-alkanone.

6. The method according to claim wherein the solvent is a $C_1$–$C_4$-alcohol or a $C_3$–$C_5$-alkanone.

7. The method according to claim 1, wherein the solvent is methanol.

8. The method according to claim 4, wherein the solvent is methanol.

9. The method according to claim 6, wherein the solvent is methanol.

* * * * *